US007011482B2

(12) United States Patent
Underwood et al.

(10) Patent No.: US 7,011,482 B2
(45) Date of Patent: Mar. 14, 2006

(54) MOLDED WASHER

(75) Inventors: J. Larry Underwood, Woodstock, GA (US); Ricky W. Tumlin, Acworth, GA (US)

(73) Assignee: L.L. Culmat, L.P., Woodstock, GA (US)

( * ) Notice: Subject to any disclaimer, the term of this patent is extended or adjusted under 35 U.S.C. 154(b) by 65 days.

(21) Appl. No.: 10/419,351

(22) Filed: Apr. 21, 2003

(65) Prior Publication Data

US 2004/0208729 A1 Oct. 21, 2004

(51) Int. Cl.
*F16B 43/02* (2006.01)

(52) U.S. Cl. ........................ 411/539; 411/531; 411/541

(58) Field of Classification Search ................ 411/539, 411/540, 541, 433, 512, 517, 521, 907, 908, 411/531; 24/452, DIG. 39; 403/364; 277/917
See application file for complete search history.

(56) References Cited

U.S. PATENT DOCUMENTS

| | | | | | |
|---|---|---|---|---|---|
| 239,111 | A | * | 3/1881 | O'Meara | 206/303 |
| 529,831 | A | | 11/1894 | Peckman et al. | |
| 554,431 | A | * | 2/1896 | White | 411/539 |
| 579,673 | A | * | 3/1897 | Dake | 403/364 |
| 647,928 | A | * | 4/1900 | Adams | 411/539 |
| 860,369 | A | * | 7/1907 | Grundy | 403/344 |
| 1,151,131 | A | * | 8/1915 | Starliper | 403/344 |
| 1,156,973 | A | * | 10/1915 | Carlson | 470/25 |
| 1,191,565 | A | * | 7/1916 | Chambers | 411/539 |
| 1,221,023 | A | | 4/1917 | Cameron | |
| 1,288,973 | A | * | 12/1918 | Osborn | 411/539 |
| 1,332,626 | A | | 3/1920 | Henegar | |
| 1,450,014 | A | * | 3/1923 | Berglof | 411/540 |
| 1,452,492 | A | * | 4/1923 | Carpenter | 411/532 |
| 1,492,561 | A | | 5/1924 | Gabriel | |
| 1,558,364 | A | | 10/1925 | Iverson | |
| 1,784,667 | A | * | 12/1930 | Gillet | 411/532 |
| 2,198,930 | A | * | 4/1940 | Wishart | 411/539 |
| 2,358,606 | A | * | 9/1944 | Summers | 411/539 |
| 3,557,413 | A | * | 1/1971 | Engle | 24/584.1 |
| 5,000,640 | A | * | 3/1991 | Haas, Jr. | 411/432 |
| 5,031,739 | A | * | 7/1991 | Flotow et al. | 192/13 R |
| 5,106,252 | A | | 4/1992 | Shapton | |
| 5,149,108 | A | * | 9/1992 | Leiszter | 277/632 |
| 5,857,800 | A | * | 1/1999 | Nell | 403/344 |
| 6,488,461 | B1 | | 12/2002 | Zacharias et al. | |
| 6,647,689 | B1 | * | 11/2003 | Pletzer et al. | 52/592.1 |

* cited by examiner

*Primary Examiner*—William L. Miller
(74) *Attorney, Agent, or Firm*—Brinks Hofer Gilson & Lione

(57) ABSTRACT

A washer formed by two identical C-shaped sections having parallel upper and lower surfaces, two ends, an inside and an outside arcuate edge, the ends having a plurality of tabs and recesses that inter-digitate to form continuous surfaces. The outside arcuate edges have a slot adjacent to one end and a flap projecting from the opposite end. The flaps are inserted into the slots of adjacent sections to retain adjoining ends in fixed relation to each other. Additional grooves on the outside arcuate edge facilitate assembly using needle-nosed pliers.

12 Claims, 6 Drawing Sheets

MOLDED WASHER

BACKGROUND

The present application is directed to washers used in mechanical structures, and particularly to washers that can be inserted in an existing mechanical structure without disassembly of that structure.

Often mechanical structures and equipment that include coupled elements, which are designed for some relative movement and have been used for some time, develop an undesirable wobble or play between the coupled elements. This wobble or play can often be reduced to an acceptable level or even eliminated by the insertion of a washer of suitable thickness between the two coupled elements. It is most desirable if the washer can be inserted without disassembling the mechanical structure.

One such washer disclosed in U.S. Pat. No. 1,558,364 is formed of two semi-cylindrical sections of identical construction. Each section includes a tongue on one end that terminates in a circular head portion having a beveled edge. The other end of each section includes a socket or recess shaped to conform to the configuration of the tongue and head including a V-shaped groove to accommodate the beveled edge of the circular head portion. While a washer can be constructed in accordance with this design when unrestricted by any other mechanical structures, the insertion of two such sections between two wobbling coupled elements becomes problematic particularly if the internal radius of the two semi-cylindrical sections closely approximates the outside radius of any coupling between the coupled elements of the mechanical structure. Further the retention of the two sections of the washer together relies on the malleability of the material forming the washer sections.

Another such washer disclosed in U.S. Pat. No. 5,106,252 is also formed of two semi-cylindrical sections of identical construction. One end of each semi-cylindrical section includes a projecting tongue while the other end includes a pair of leaves defining a slot adapted to receive a projecting tongue of the adjacent semi-cylindrical section. In one embodiment the tongue includes a centrally located depression while one of the leaves includes a centrally located projection sized and located to fit in the depression. In another embodiment the tongue includes a centrally located projection while one of the leaves includes a centrally located depression sized and located to receive the projection on the tongue. In all embodiments, the two semi-cylindrical sections of the washer are retained together by the conjunction of the projections and depressions on the tongues and slot-defining leaves. To achieve assembly of such a construction, however, the two leaves of each slot must be spread apart by a distance sufficient to let the projection squeeze past an un-depressed portion of the washer until the locking position is achieved. While a washer can be constructed in accordance with this design when unrestricted by any other mechanical structures, the insertion of two such sections into a space between two wobbling coupled structures becomes problematic. This temporary spreading of the two leaves requires that the size of the space into which the washer is being assembled must be greater than the thickness of the washer once assembled, thus leaving room for wobble and play to continue.

Other washers are disclosed in U.S. Pat. Nos. 1,332,626 and 6,488,461 that have connecting features on the ends of the two sections of such design that the size of the space between the two wobbling coupled structures must be at least twice the thickness of the washer once assembled, thus leaving even more room for wobble and play to continue. What is needed is a washer that is capable of insertion in a space between two wobbling coupled structures, the washer being of the same thickness as the space between the coupled structures, to remove all play between the coupled structures.

BRIEF SUMMARY

A washer of the present invention can be formed of an engineering plastic and has two substantially identical C-shaped sections, each section having parallel upper and lower surfaces and a perimeter comprising two ends, an inside arcuate edge and an outside arcuate edge. The ends include a plurality of tabs and recesses configured so that adjoining ends of the two sections inter-digitate to form a substantially continuous surface. The shape of the tabs and recesses is selected so that the inter-digitation can be achieved without requiring any change in the thickness of the washer. Surface features can be provided on the outside arcuate edge adjacent to the ends to interact with a washer installing tool facilitating inter-digitation of the tabs and recesses. Locking means is provided to ensure that the inter-digitation of the sections is maintained during normal use.

In one embodiment, the ends of the two sections are formed so that one of the tabs and the cooperating recess in which the tab is received are longer than the remaining tabs and recesses. The longer tab and recess can include a slight reverse taper or enlargement that causes a slight lateral displacement of the contacting surfaces during insertion. As the longer tab and recess become further engaged the pressure on the contacting surfaces is relieved thus allowing the material forming the washer to return to its initial position. The return is assisted by the inter-digitation of the remaining tabs and recessed, which effectively lock the longer tab and recess in place.

In another embodiment, the two C-shaped sections are formed as a unitary, one piece structure with a bridging member joining the outer edges of one end of the sections. The bridging member is sufficiently flexible to permit relative movement between the two sections about a hinge point defined by the bridging member. The two sections can be spread apart far enough to permit the open end of the washer to surround any core member of the mechanism in which the washer is to be installed. Surface features can be provided on the outside arcuate edges of the sections adjacent to the open end. The surface features can be used to interact with a washer installing tool facilitating inter-digitation of the tabs and recesses. The surface features can also receive a small keeper for locking the washer together after installation.

In still a further embodiment, the outside arcuate edge of each section includes a slot adjacent to one end and a flap projecting from the opposite end. The flap on each of the sections is dimensioned to be inserted into the slot of the adjacent section locking the adjoining ends of the two sections in fixed relation to each other. Again, the assembly of the flap on one section into the slot of the adjacent section can be achieved without requiring any change in the thickness of the washer. Thus the thickness of the washer can be selected to match identically the space between two wobbling coupled structures thereby enabling the washer to remove all play between the coupled structures.

DETAILED DESCRIPTION OF THE DRAWINGS AND THE PRESENTLY PREFERRED EMBODIMENTS

Figure 1:
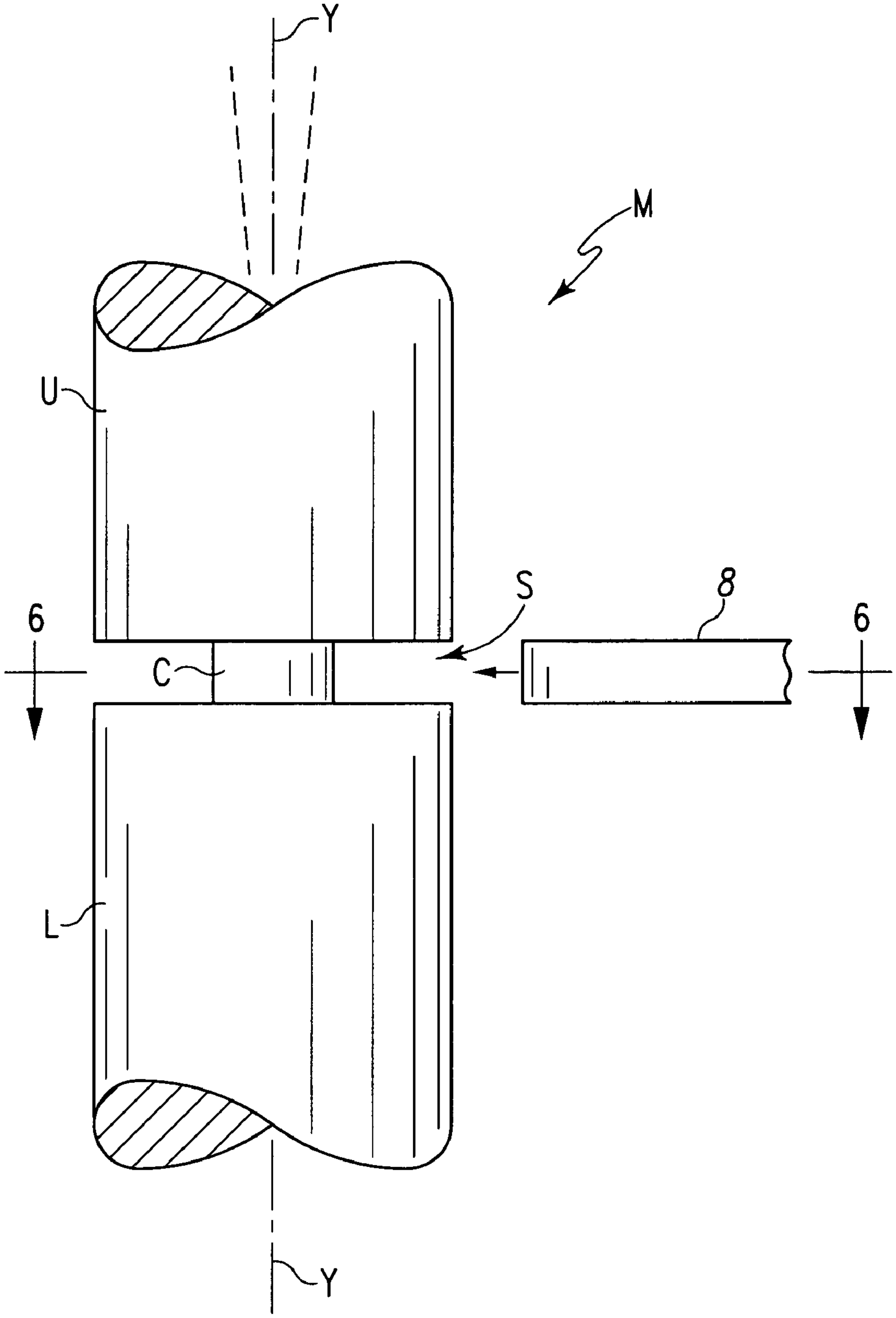
FIG. 1 is a side elevation view of a mechanical structure including a space and a coupling between the elements with a washer of the present invention being inserted into the space.

FIG. 1 shows a mechanical structure M consisting generally of an upper element U and a lower element L coupled together by a coupling C. The coupling C is surrounded by a space S. Assuming that the elements U and L are capable of some independent movement, the space S is sufficient to allow some wobble or play to develop between the elements as indicated by the variation in position of axis Y. This opportunity for wobble or play can be significantly reduced or eliminated by the insertion of a washer 8 of the present invention into the space S.

Figure 2:
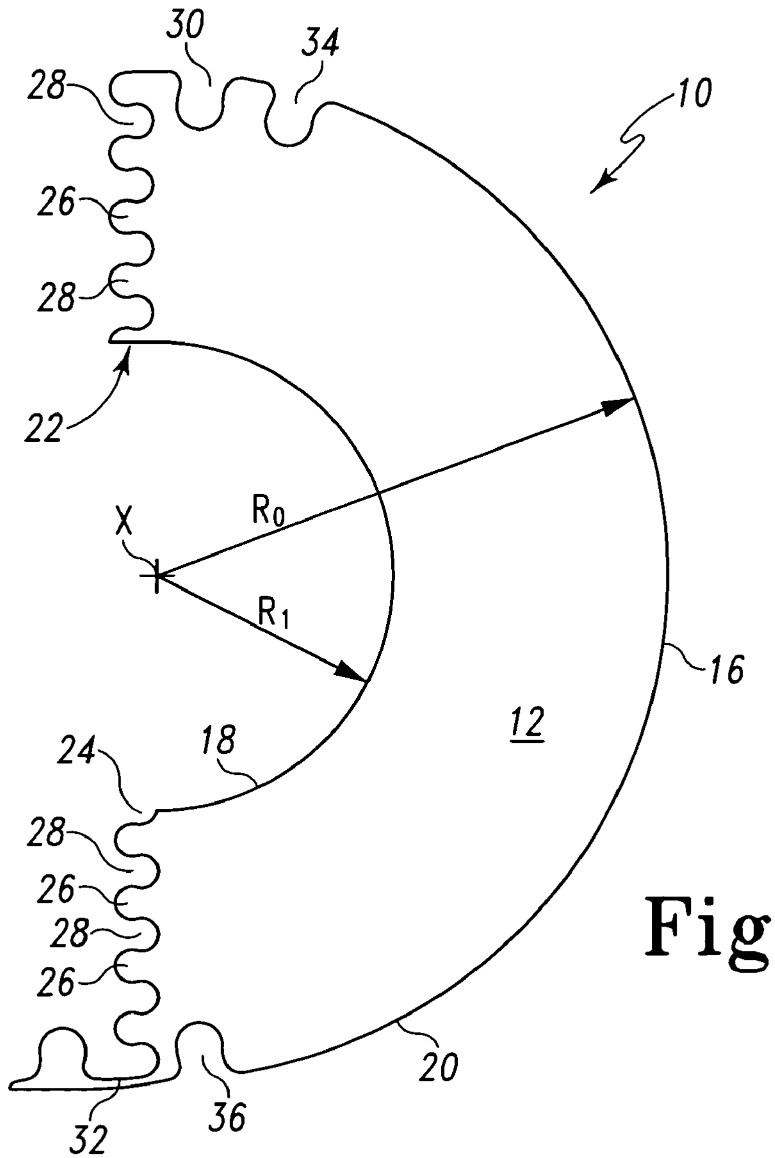
FIG. 2 is a plan view of a washer section of the present invention.
Figure 3:
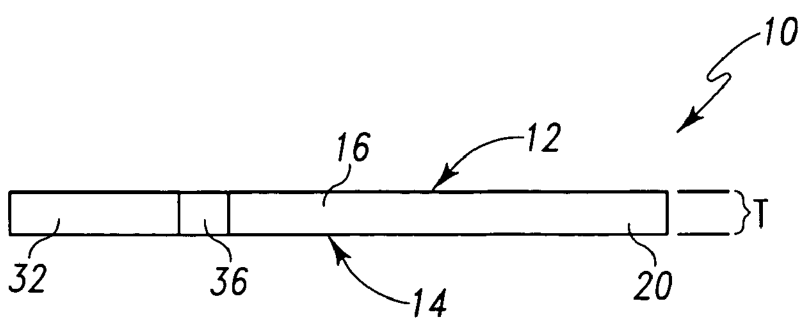
FIG. 3 is an elevation view of the washer section as viewed from the bottom of FIG. 2.

A C-shaped section 10 for forming a washer 8 of the present invention is shown in FIGS. 2 and 3. The section 10 has an upper surface 12 and a lower surface 14 that are parallel to each other and define the thickness T of the section. The thickness T can be selected to have any desired value necessary to match the opening in space S. Typically, the C-shaped sections 10 can be manufactured in several thicknesses for selection by the user in differing situations, and can be combined so that more than one washer 8 is employed to fill the opening of space S. The C-shaped section also has a perimeter 16 joining the upper and lower surfaces 12 and 14. The perimeter 16 includes an inside arcuate edge 18 and an outside arcuate edge 20. The inside arcuate edge 18 has a radius of curvature $R_I$ while the outside arcuate edge 20 has a radius of curvature $R_O$. The curvatures are typically concentric about the same axis X. The C-shaped sections 10 can be manufactured to have a variety of differing values for both $R_I$ and $R_O$.

The perimeter 16 of the section 10 also includes two ends 22 and 24. Each of the ends 22 and 24 includes a plurality of tabs 26 and recesses 28. The outside arcuate edge 20 of the section 10 includes a slot 30 adjacent to one end 22 and a flap 32 projecting from the opposite end 24. The outside arcuate edge 20 of the section 10 also includes grooves 34 and 36 that are shown to have a shape similar to slot 30 but can be configured to have other shapes. The function of the tabs 26, recesses 28, slot 30, flap 32, and grooves 34 and 36 can be understood from a consideration of FIGS. 4 and 5.

Figure 4:
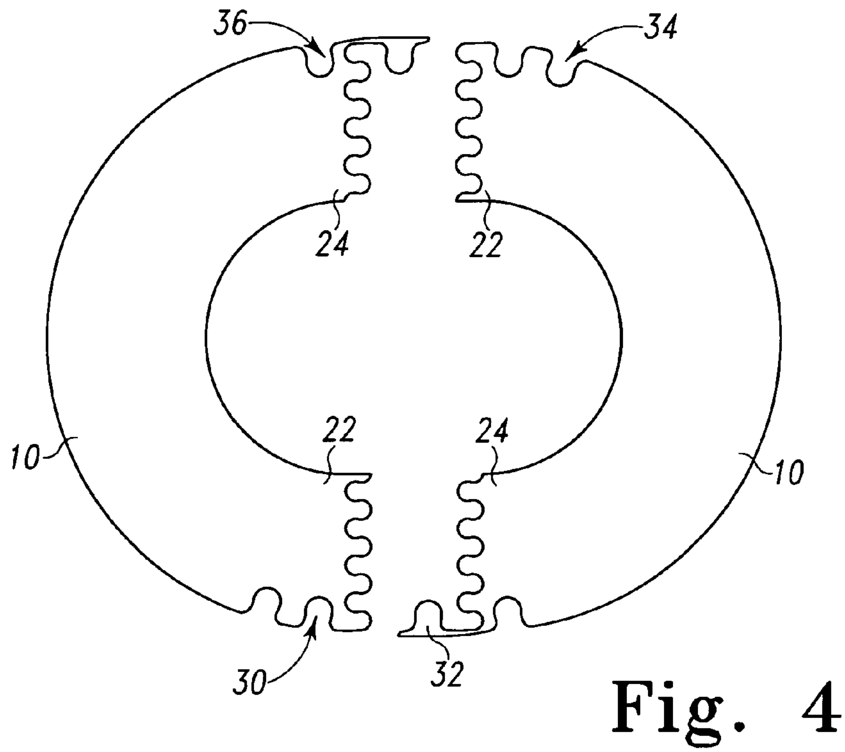
FIG. 4 is a plan view of a pair of sections of the present invention arranged in a confronting relationship.
Figure 5:
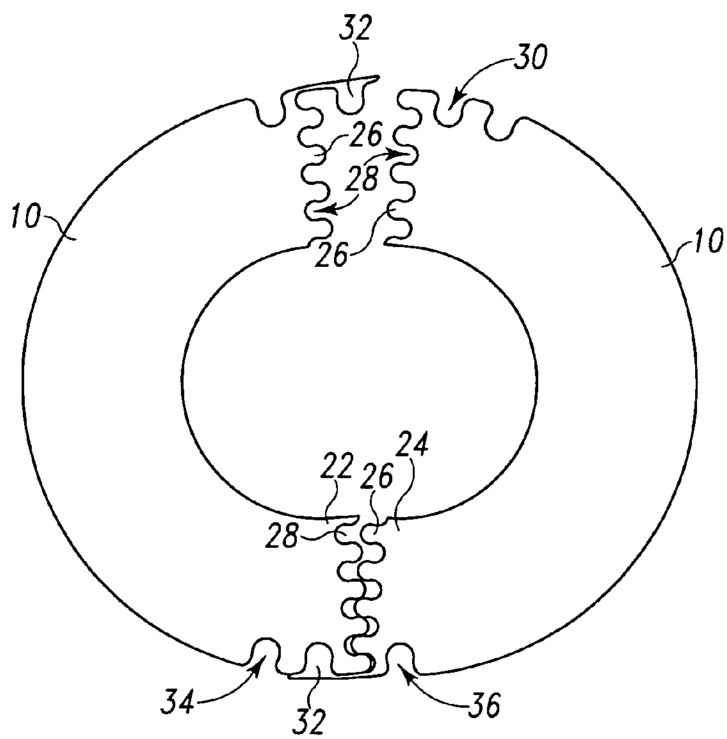
FIG. 5 is a plan view of the pair of sections shown in FIG. 4 in a partially assembled condition.

FIG. 4 shows two sections 10 of the present invention spaced from each other, but arranged so that end 22 on each section 10 confronts end 24 of the other section. FIG. 5 shows the two sections 10 partially assembled together. It will be immediately recognized from FIGS. 4 and 5 that in such an arrangement, the tabs 26 and recesses 28 of the adjoining ends 22 and 24 of the two sections are dimensioned to inter-digitate to form a substantially continuous washer. Further, it will be noted that the shape of the tabs 26 and recesses 28 is selected so that the inter-digitation can be achieved without requiring any change in the thickness T of the washer. The inter-digitation of the tabs 26 and recesses 28 serves to diminish the likelihood of any lateral displacement of the two sections with respect to each other. It will be further noted that the flap 32 on end 24 can overlie the outside arcuate edge 20 of the adjacent section 10 by a distance sufficient to permit engagement of the flap 32 into slot 30 to retain the washer in assembled condition. To assist in the assembly of the sections 10 to form the complete washer, a tool such as needle nose pliers can be inserted in the grooves 34 and 36 to apply a closing pressure on the pair of washer sections 10. The shape of the grooves 34 and 36 can be selected to cooperate with the force-applying surfaces of the selected tool, and need not be as illustrated.

Figure 6:
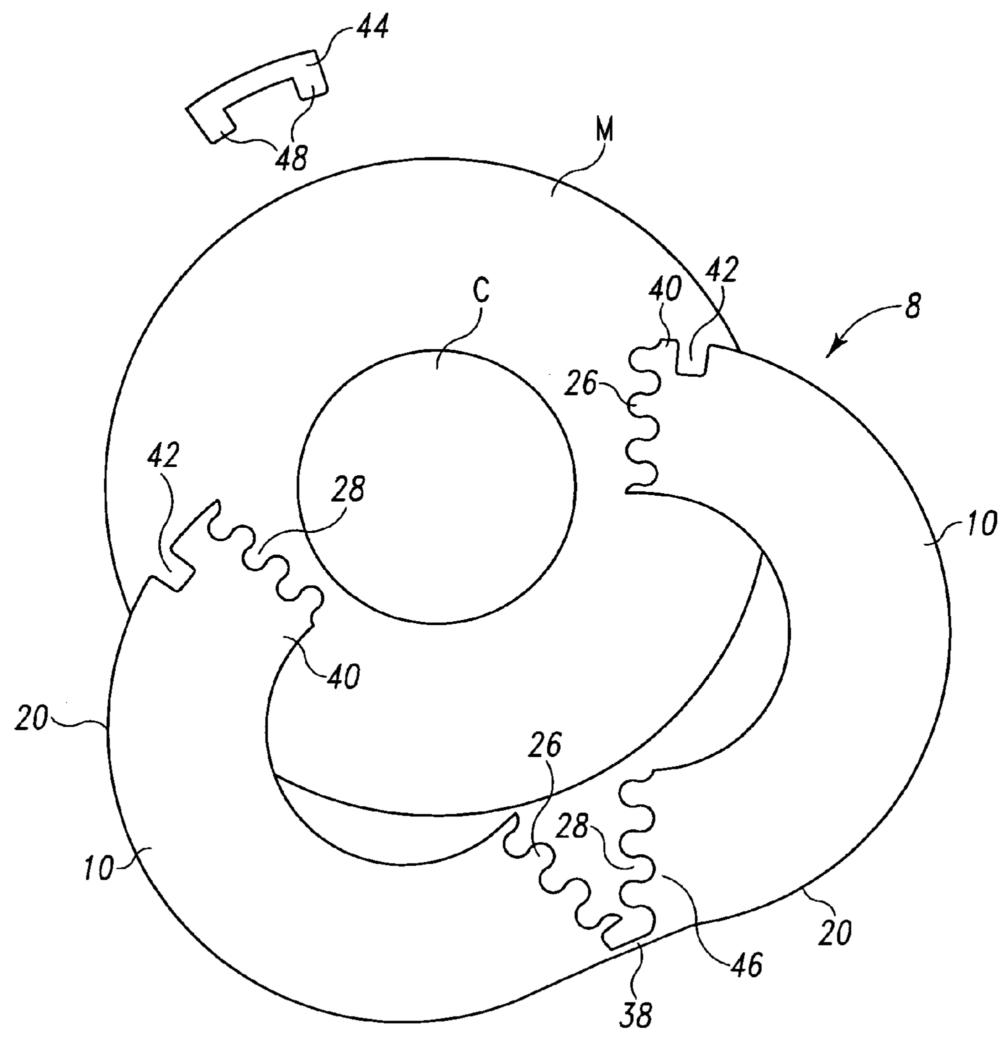
FIG. 6 is a plan view of an alternative embodiment of the invention partially inserted into the space between the elements of a mechanical structure such as that shown in FIG. 1.

FIG. 6 shows another washer 8 of the present invention that includes two C-shaped sections 10, which are formed as a unitary, one piece structure, with a bridging member 38 joining the outer edges 20 of one end of the sections 10. The bridging member 38 is sufficiently flexible to permit relative movement between the two sections 10 about a hinge point defined by the bridging member 38. The two sections can be spread apart far enough to permit the open end 40 of the washer 8 to surround any coupling C of the mechanism M in which the washer 8 is to be installed. The open end 40 and the hinged end 46 includs a plurality of tabs 26 and recesses 28 dimensioned to inter-digitate without requiring any change in the thickness T of the washer. Surface features 42 can be provided on the outside arcuate edges 20 of the sections 10 adjacent to the open end 40. The surface features 42 can be used to interact with a washer installing tool, such as needle nose pliers, to facilitate the inter-digitation of the tabs 26 and recesses 28. The surface features 42 can also receive a small keeper 44 for locking the washer sections 10 together after installation. The keeper 44 can be formed of a variety of materials and can include tabs 48 intended to interact with the surface features 42 to secure the keeper 44 in place.

Figure 7:
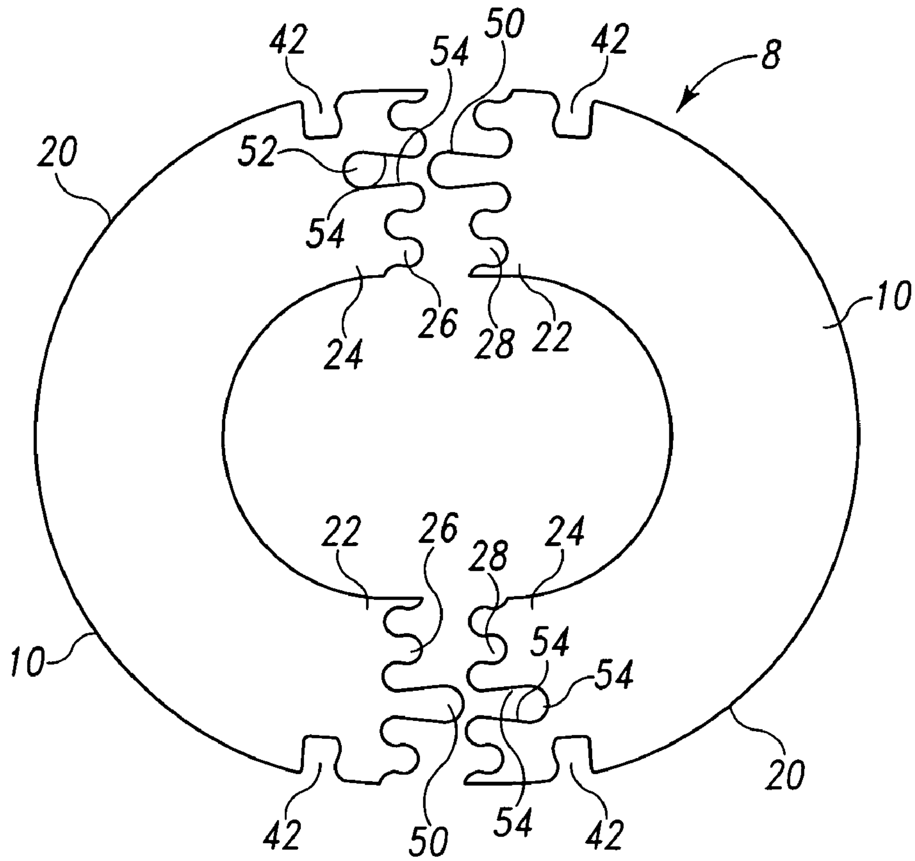
FIG. 7 is a plan view of another alternative embodiment of the invention with the sections arranged as in FIG. 4.

FIG. 7 shows another washer 8 of the present invention that includes two sections 10 that are spaced from each other, but arranged so that end 22 on each section confronts end 24 of the other section. The ends 22 and 24 include a plurality of tabs 26 and recesses 28 dimensioned to inter-digitate without requiring any change in the thickness T of the washer to form a substantially continuous washer. It will be noted that the ends of the two sections 10 are formed so that one of the tabs 50 and the cooperating recess 52 in which the tab 50 is received are longer than the remaining tabs 26 and recesses 28. The longer tab 50 and recess 52 can include a slight reverse taper or enlargement that causes a slight lateral displacement of the contacting surfaces 54 of the recess 52 during insertion of an initial portion of the tab 50. As the longer tab 50 and recess 52 become further engaged, the pressure on the contacting surfaces 54 is relieved thus allowing the material forming the washer 8 to return to its initial position. This return is assisted by the inter-digitation of the remaining tabs 26 and recesses 28, which effectively lock the longer tab 50 and recess 52 in an engaged relation relative to each other. Surface features 42 can be provided on the outside arcuate edges 20 of the sections 10 that can be used to interact with a washer installing tool, such as needle nose pliers, and can also receive a keeper 44 similar to that shown in FIG. 6.

Figure 8:
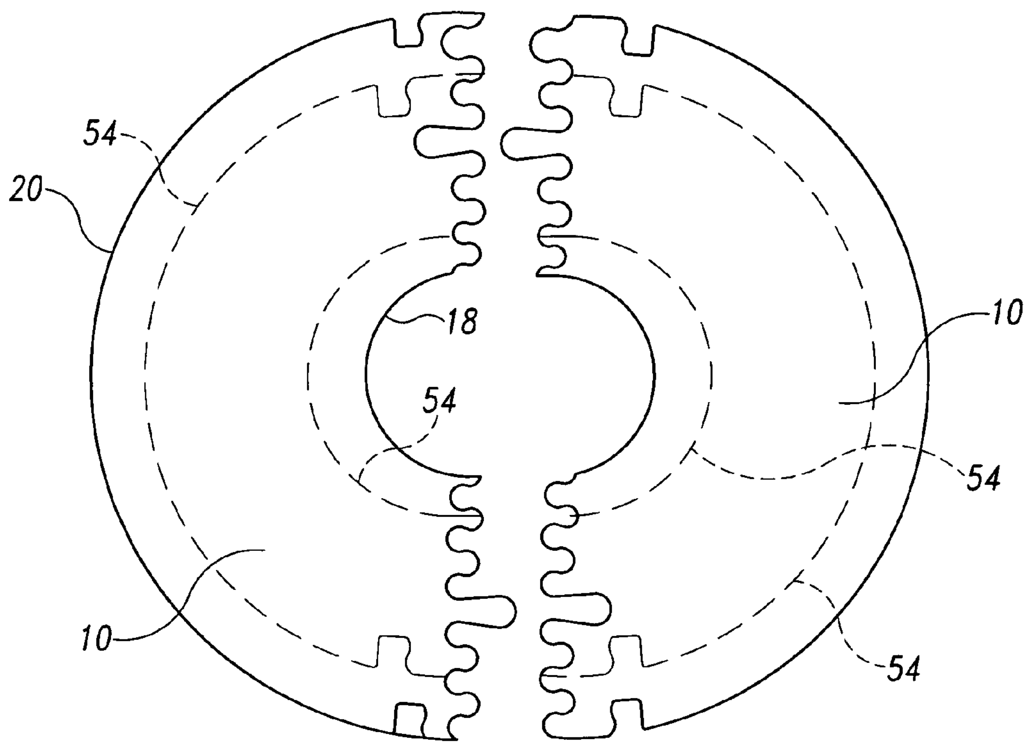
FIG. 8 is another plan view intended to illustrate any of the embodiments of the present invention with the added feature of certain perforation lines.

Any of the washers 8 of the present invention can be formed as shown in FIG. 8 as sections 10 that include perforation lines 54 running generally parallel to the inside arucate edge 18 and outside arcuate edge 20. The perforation lines 54 permit adaptation of the washer 8 to accommodate mechanical structures M and couplings C of varying size. The perforation lines 54 can include provisions for surface features 42, slots 30, flaps 32, and other characteristic elements of a washer 8 of the present invention. While all of the illustrated embodiments show washers formed of two sections occupying about 180°, it will be appreciated that a washer 8 of the present invention can be formed with three sections having any of the previously disclosed features.

The foregoing detailed description should be regarded as illustrative rather than limiting, and the following claims, including all equivalents, define the spirit and scope of this invention.

What is claimed is:

1. A washer comprising:

two identical C-shaped sections, each section having parallel upper and lower surfaces and a perimeter comprising two ends, an unthreaded inside arcuate edge and a substantially smooth outside arcuate edge, and a plurality of tabs projecting from the ends and separated from each other by intervening recesses configured so that the tabs and recesses of adjoining ends of the two sections can inter-digitate to form a substantially continuous surface, the tabs and recesses being configured so that the inter-digitation is achieved without requiring any change in the thickness of the washer, the smoothly smooth outside arcuate edge including a groove adjacent to each end for receiving an installing tool to facilitate inter-digitation of the tabs and recesses, the groove extending through the upper and lower surfaces of the section.

2. The washer of claim 1 further comprising an additional slot adjacent to one end of the outside arcuate edge of both sections and a flap projecting from the opposite end, the flap on each of the sections being inserted into the additional slot of the adjacent section to retain the adjoining ends in fixed relation to each other.

3. The washer of claim 1 wherein a selected one of the tabs projecting from each end is longer than the remaining tabs, and a corresponding one of the recesses is longer than the remaining recesses.

4. The washer of claim 3 wherein a portion of the side of the longer tab includes a reverse taper.

5. The washer of any of claim 1, 3 or 4 further comprising a perforation line lying parallel to one of the arcuate edges.

6. The washer of any of claim 1, 3 or 4 consisting essentially of a polymer selected from the acetals, polyamides, and polyethylenes.

7. A C-shaped molded polymeric washer section comprising:

parallel upper and lower surfaces and a perimeter comprising two ends, an unthreaded inside arcuate edge and a substantially smooth outside arcuate edge, a plurality of tabs projecting from the ends, the tabs being separated by intervening recesses sized and shaped to receive corresponding tabs projecting from an end of an identically shaped C-shaped washer section, the substantially smooth outside arcuate edge including a groove adjacent each end adapted to receive a washer installing tool facilitating inter-digitation of the tabs and recesses of each end with an adjacently positioned end of the identically shaped C-shaped washer section, the groove extending through the upper and lower surfaces of the washer section.

8. The C-shaped molded polymeric section of claim 7 further comprising a flap projecting from an outside edge of one end and an additional groove in the other end, the flap being configured to be received in one of the additional grooves on another identically shaped C-shaped section to retain adjoining ends in fixed relation to each other.

9. The C-shaped molded polymeric section of claim 7 a selected one of the tabs projecting from one end is longer than the remaining tabs, and a one of the recesses in the other end is longer than the remaining recesses.

10. The C-shaped molded polymeric section of claim 9 wherein a portion of the longer tab includes sides having a reverse taper.

11. The C-shaped molded polymeric section of any of claim 7, 9 or 10 further comprising a perforation line lying parallel to one of the arcuate edges.

12. The C-shaped molded polymeric section of any of claim 7, 9 or 10 consisting essentially of a polymer selected from the acetals, polyamides, and polyethylenes.

* * * * *